July 22, 1947.                R. E. GREENOUGH                2,424,233
                                 LANDING GEAR
                    Filed Aug. 28, 1942              3 Sheets-Sheet 1
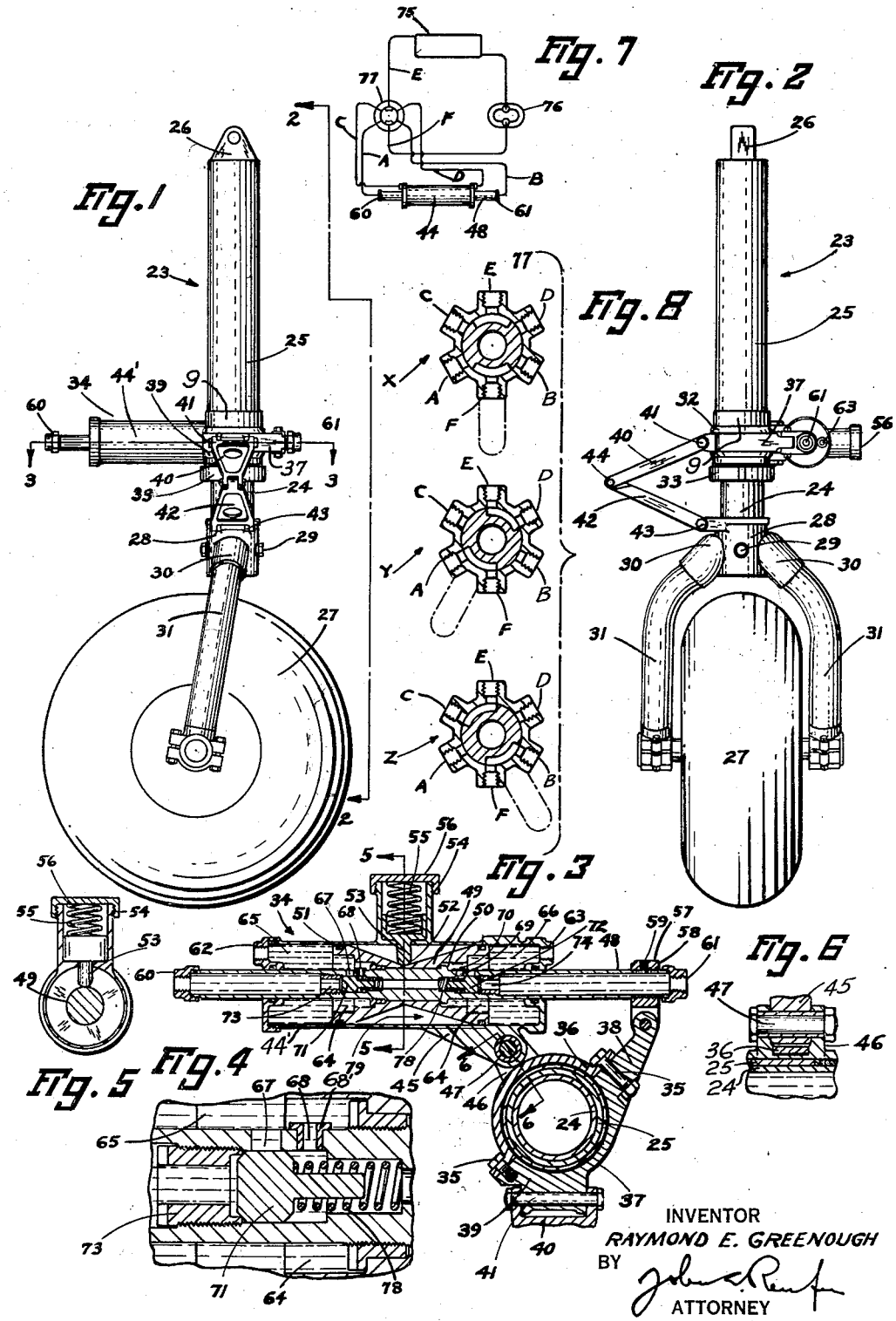
INVENTOR
RAYMOND E. GREENOUGH
BY
ATTORNEY July 22, 1947.  R. E. GREENOUGH  2,424,233
LANDING GEAR
Filed Aug. 28, 1942   3 Sheets-Sheet 2
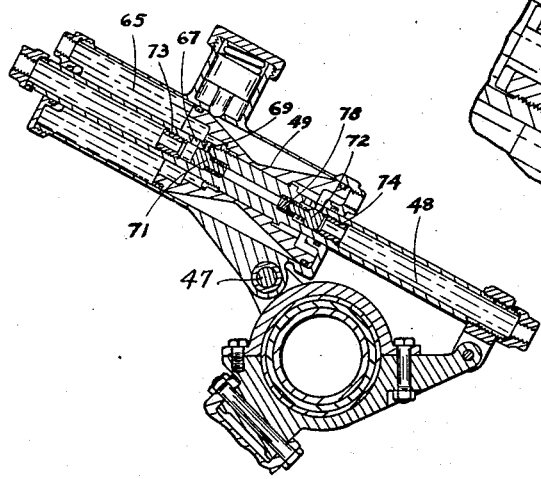
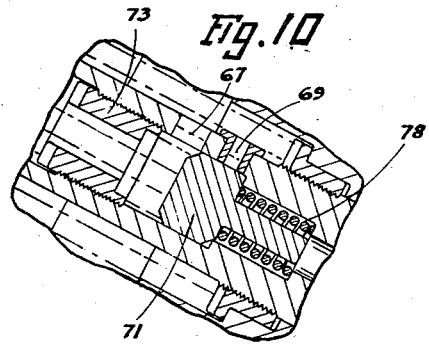
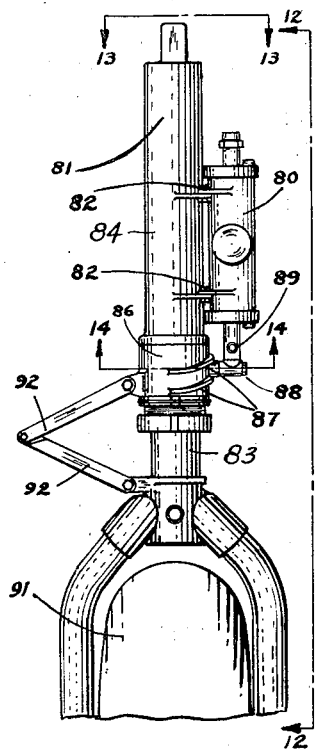
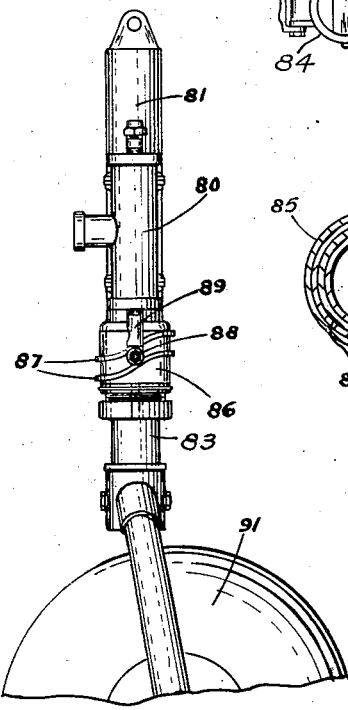
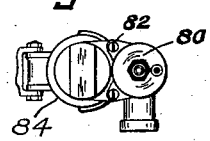
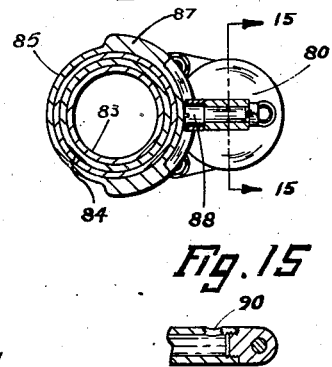
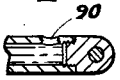
INVENTOR
RAYMOND E GREENOUGH
BY
ATTORNEY

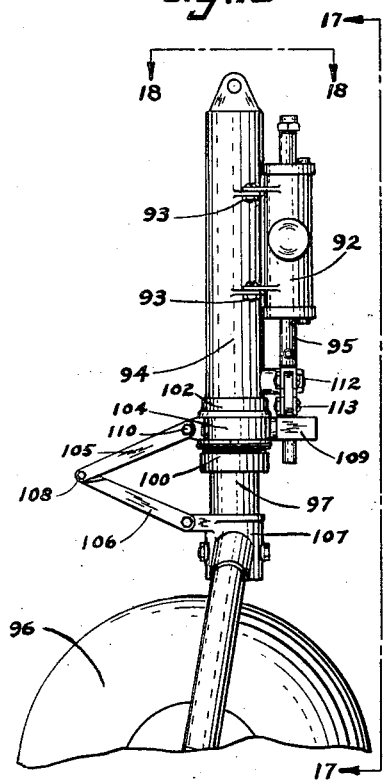
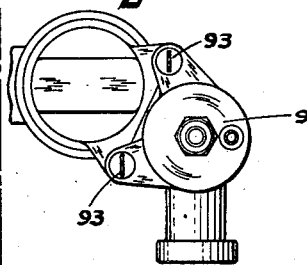
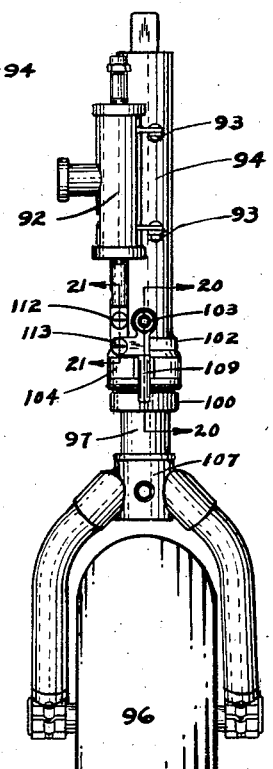
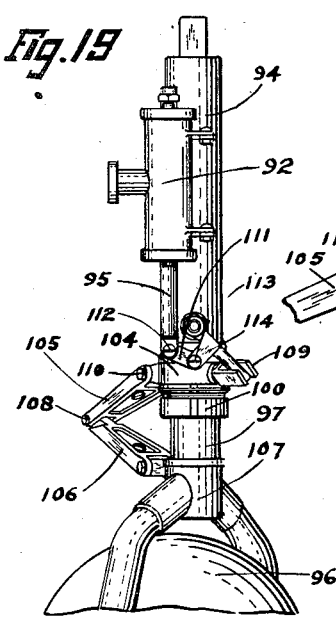
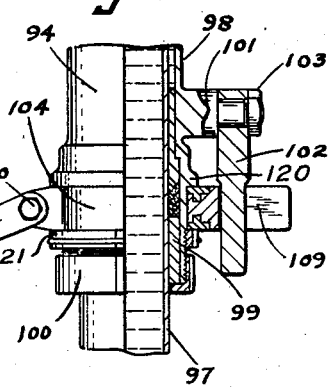

Patented July 22, 1947

2,424,233

UNITED STATES PATENT OFFICE 2,424,233

LANDING GEAR

Raymond E. Greenough, Maple Heights, Ohio, assignor to The Cleveland Pneumatic Tool Company, Cleveland, Ohio, a corporation of Ohio Application August 28, 1942, Serial No. 456,475

8 Claims. (Cl. 244—50)

The present invention relates broadly to aircraft, but more particularly to a new and improved nose wheel assembly suitable for use with aircraft.

An important object of the invention is to provide an improved means for dampening or substantially eliminating lateral oscillation or shimmy of the nose wheel as contact is made with the ground in landing or taxiing of the airplane on the field.

Another object of this invention is the production of a novel form of steering mechanism associated with the nose wheel of an airplane whereby relatively sharp and rapid turns can be effected during the taxiing of the airplane without causing undue stress or strain on the moving parts regardless of the load being carried.

A further object is to provide a steering mechanism for the nose wheel of an airplane having the above characteristics in which the steering thereof is accomplished with a greater degree of skill by the pilot with a minimum amount of effort on his part. More specifically the invention comprehends the use of hydraulic means adapted to be controlled by valves from the cockpit of the airplane to effect movement of a piston mounted on the strut of the landing gear, the piston being connected through suitable means to the nose wheel to impart motion thereto.

A still further object of the invention resides in the provision of a novel means forming a part of the improved steering mechanism for causing the wheel, when in contact with the ground, to remain central, that is in line with the direction of motion of the aircraft.

Other objects and advantages more or less ancillary to the foregoing reside in the specific construction and aggroupment of the elements peculiar to this structure, as will become apparent from a more complete examination of this specification.

In the drawings:

Fig. 1 is a side elevational view of a nose wheel and strut with the invention mounted thereon.

Fig. 2 is a front elevational view looking in the direction of the arrows 2—2, of Figure 1.

Fig. 3 is a longitudinal sectional view taken substantially on line 3—3 of Fig. 1.

Fig. 4 is an enlarged sectional view of parts illustrated in Fig. 3.

Fig. 5 is a vertical sectional view taken substantially on line 5—5 of Fig. 3.

Fig. 6 is a detail sectional view taken substantially on line 6—6 of Fig. 3.

Fig. 7 is a diagrammatic view of the hydraulic system for supplying fluid to the steering mechanism.

Fig. 8 is an exploded sectional view illustrating the relative open and closed positions of the valve ports.

Fig. 9 is a view similar to Fig. 3 but illustrating the parts in operating position.

Fig. 10 is an enlarged sectional view of parts shown in Fig. 9.

Fig. 11 is a front elevational view of a modified form of the invention.

Fig. 12 is a side elevational view thereof looking in the direction of the arrows 12—12 of Fig. 11.

Fig. 13 is a top plan view looking in the direction of the arrows 13—13 of Fig. 11.

Fig. 14 is a horizontal sectional view taken substantially on line 14—14 of Fig. 11.

Fig. 15 is a detail sectional view taken substantially on line 15—15 of Fig. 14.

Fig. 16 is a side elevational view of a still further modified form of the invention.

Fig. 17 is a front elevational view thereof looking in the direction of the arrows 17—17 of Fig. 16.

Fig. 18 is a top plan view looking toward the arrows 18—18 of Fig. 16.

Fig. 19 is a front elevational view of the form shown in Fig. 16, with the parts illustrated in their steering position.

Fig. 20 is a partial sectional view taken substantially on line 20—20 of Fig. 17.

Fig. 21 is a detail sectional view taken substantially on line 21—21 of Fig. 17.

Referring to the drawings for a more detailed description thereof, and particularly Figs. 1 to 10 inclusive, a strut of conventional construction is indicated generally by the reference numeral 23 and comprises inner and outer telescoping sections 24 and 25, the section 25 having a closed upper end formed with a clevis 26 for attachment of the assembly to the aircraft. The wheel 27 is suspended from the lower end of the section 24 in the usual manner including a collar 28 bolted or otherwise secured as indicated at 29 to the section, with sleeve like portions 30 diverging therefrom which carry the fork arms 31 between which the wheel 27 is journaled. The above is conventional construction and forms no part of the present invention, the same being used solely for illustrating purposes.

In accordance with the present invention two semi-cylindrical yokes 36 and 37 secured to each other by fastenings 35, together form a collar which is rotatable upon the tubular section 25 of the shock absorber. Yoke 37 has a tapered portion 38 extending from one end and a relatively wide strip 39 extending from its other end. A torque arm 40 has one end secured by means of a bolt or the like 41 to the strip 39 while a similar torque arm 42 has one end secured as indicated at 43 to the collar 28 fixed upon the telescoping member 24. The opposite ends of the arms are pivotally connected at 44 and the construction described permits said arms to hinge toward and away from each other with the telescoping of the sections 24 and 25 while normally preventing rotation thereof.

The means for dampening and steering the nose wheel 27 includes a cylinder 44' having a web portion 45 pivotally connected to a bracket 46 by means of a bolt or the like 47, said bracket projecting from and forming a part of the telescoping member 25. A hollow tubular member 48 is mounted centrally of the cylinder 44 and when in normal position projects beyond each end thereof adapted to admit liquid within said cylinder for operating the steering mechanism. The tube 48 carries a piston 49, the same being secured thereto as indicated at 50 whereby axial movement of the piston causes like movement of the tube 48. The ends only of the piston 49 frictionally engage the walls of the cylinder 44' and are provided with sealing rings 51 to prevent the escape of fluid. The construction of the piston is best shown in Fig. 3 and it will be observed that said piston tapers from each end toward the center with the low point 52 normally contacted by a plunger pin 53 slidably carried within a cup 54 integral with and extending laterally from the cylinder 44. A tension spring 55 held within the cup by means of the cap 56, urges the pin 52 into constant contact with the inclined outer surface of the piston. By this construction the piston is normally positioned centrally of the cylinder thus tending to cause the nose wheel to remain central, that is in line with the direction of motion of the aircraft.

As is to be understood, the piston 49 is operated by liquid under pressure to effect steering of the nose wheel and, since the piston 49 and tubular member 48, respectively, move in unison, one end 57 of the member 48 is connected to the portion 38 through the medium of an internally threaded collar 58 locked to member 48 by a set screw 59. Thus steering of the wheel as the piston is operated, is accomplished by the turning of the collar constituted by the yokes 36 and 37, arms 40 and 42 and collar 28, the cylinder 44' swinging on pin 47.

The ends of the member 48 are provided with nipples 60 and 61 for connection with a liquid supply line, and likewise the ends of the cylinder 44' are formed with outlet connections 62 and 63. Normally the chambers at each end of the cylinder contain an equalized pressure of liquid. It will be observed that each end of the piston 49 is recessed as shown at 64.

Communication between the chambers 65 and 66 and the tubular member 48 is obtained by way of recesses 64 through valve controlled ports 67, 68, 69 and 70, respectively. A spring backed valve 71 is slidably mounted within one end of the member 48 for controlling the ports 67 and 68, and a similar valve 72 is slidably mounted in the other end of said member for controlling the ports 69 and 70. Said valves are held in position by means of threaded plugs 73 and 74, respectively in the assembly of the device.

As shown diagrammatically in Fig. 7, a liquid reservoir 75 is to be mounted on the airplane together with a conventional pump 76 and a central control valve 77 with pipe lines leading from the valve to the various connections of the device 34. The control valve 77 is to be readily accessible to the pilot and is therefore preferably located in the cockpit. Lines A and B lead from the control valve 77 and are connected to the nipples 60 and 61 respectively, for supplying liquid to each end of the tubular member 48. Liquid is exhausted from the chambers 65 and 66 through the lines C and D leading from the nipples 62 and 63, respectively, and then returned to the reservoir 75 through the line E. The liquid is conveyed to the control valve 77 from the reservoir through the line F by means of the pump 76.

In the operation of the device above described, when desiring to steer the wheel to the right, for example, the control valve is moved from its neutral position shown at X in Fig. 8 of the drawing to the position shown at Y. In this position liquid will be admitted through line A into the tube 48 through nipple 60 and exhausted from the chamber 66 by action of the piston, through line D. It is, of course, understood that lines B and C are closed so that liquid cannot be admitted to member 48 through nipple 61 nor exhausted from chamber 65. Liquid entering tube 48 through the connection 60 will move valve 71 against the tension of spring 78 to uncover port 67 and at the same time close port 68, allowing additional liquid to enter chamber 65. The action of the liquid on the piston 49 will urge the latter in the direction of the arrow 79 causing displacement of the liquid in the chamber 66, and the tubular member 48 being secured to the piston will move in unison therewith until the entire assembly assumes substantially the position shown in Fig. 9. As the tube 48 is axially moved, the collar constituted by yokes 36 and 37 is caused to rotate which, through the action of the torque arms 40 and 42, will turn the nose wheel 27. In order to turn the wheel to the left the action is reversed with the control valve moved to the position shown at Z in Fig. 8. In this instance the lines B and C will be open with the lines A and D closed.

The valves 71 and 72 therefore move to block the passage of liquid through the piston 49 during steering operations. At other times they are both open, and the pressure in the two chambers 65 and 66 is equalized. One of the ports 68 and 70 is constricted so that flow through the bore of the piston 49 is delayed. As herein illustrated the bushing 68' is inserted into port 68 to form the constriction. For different installations constrictions of different sizes are desirable, and by providing bushings 68' of different bores, a constriction of the proper size for any given case may be obtained. When in the course of landing or taxiing the nose wheel strikes an obstruction which tends to deflect the wheel suddenly from its course, relative motion is imparted to the cylinder 44' and piston 49, but this motion is checked because free travel of liquid through the passage in piston 49 is prevented by the constriction of port 68. In other words, a shock absorbing effect is incorporated in the steering mechanism. Shimmy, which would tend to produce alternating rapid reversals of flow through the piston passage, is therefore strongly opposed, if not entirely eliminated. The spring-pressed plunger 53 bearing upon the hourglass exterior of the piston functions whenever the piston is displaced from its central position to return it to that position and the nose wheel to its straight ahead position, that is as rapidly as the constricted passage through the piston will permit.

In the modified form of the invention illustrated in Figs. 11 and 12, the interior mechanism and function of the cylinder 80 is essentially the same as that previously described. In this form of the invention, however, the cylinder is vertically mounted on the strut 81, being supported by means of brackets or the like 82. The strut 81 includes a pair of tubes 83 and 84 mounted in telescoping relation, the tube 84 being surrounded by a rotatable collar 85. This collar carries a pair of spaced cam surfaces 87 between which ride a roller 88 suitably supported on the end of the tubular member 89, the latter corresponding to member 48 in the preferred form. Since the lower end of member 89 carries the roller 88, it is necessary to form the liquid admitting port in one side wall as more particularly shown at 90 in Fig. 15 of the drawings.

It is believed that the operation of this modified form of the invention is readily obvious. Upon actuation of the piston within the cylinder to steer the wheel to the right or left, the tubular member 89 will likewise be actuated causing movement of the roller 88 within the cam track 87 to effect partial rotation of the collar 85 which will turn the wheel 91 through the medium of the arms 92.

In Figs. 16 to 21 both inclusive, there is illustrated a still further modified form of the invention. In this instance the cylinder 92 is vertically mounted on brackets 93 to the strut 94, said cylinder including a tubular member 95 of the type previously described and adapted to be actuated for steering the nose wheel 96. The strut 94 comprises the conventional pair of telescoping tubes 97 and 98 separated by a gland and packing 99 and held in position by the packing nut 100. Extending from and integral with the tube 98 is a fitting 101 which pivotally supports a lever, 102 and referring more particularly to Fig. 20 of the drawings, it will be noted that said lever is suspended from the fitting 101 and is held thereon by means of a nut 103. A collar 104 is rotatable upon the tube 98 to which is attached one end of a torque arm 105. Collar 104 is disposed between an annular shoulder 120 on the tube 98 and a ring 121 threaded on tube 98 above the packing nut 100. A second torque arm 106 has one end attached to the sleeve 107 which is secured to the tube 97, the opposite ends of said arms being connected together as shown at 108 and adapted to normally prevent relative rotation of the respective tubes. A U-shaped member 109 has a clevis connection with the collar 104 the same being diametrically opposed to the connection 110 of the arm 105. A link 111 has one end pivotally connected at 112 to the lower end of the tubular member 95, the other end of said link being pivotally connected at 113 to an arm 114, the latter being integral with and extending at right angles to the lever 102 adjacent the upper end thereof. The free end of lever 102 is disposed between the jaws of member 109.

In the operation of the second modified form, vertical movement of the member 95 will transmit motion to the torque arms 105 and 106 and sleeve 107 to steer the nose wheel through link 111, arm 114, lever 102 and collar 104. In Fig. 17 the parts are shown in neutral position with the nose wheel in a central or straight direction, but in Fig. 19 the steering mechanism has been operated by the pilot to turn the wheel to the right. It will be observed that the member 95 is in its lower extended position and that its associated mechanism has been partially moved to effect the steering action.

It will be observed that in all three forms of the invention herein disclosed, the hydraulic unit is mounted on one of the two telescoping members of a shock strut and serves to turn a collar that is rotatably mounted on that member, and that this turning motion is transmitted to the other telescoping member through the intermediacy of the hinged torque arms. These torque arms are conventionally used in the industry to maintain two telescoping strut members in alignment, that is to prevent relative rotation. They have the same function in the present invention so long as the nose wheel is directed for straight line travel, but in accordance with the invention they are called upon to discharge the additional function of transmitting steering stress to the vertically movable lower tube of the shock strut.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

Having thus described my invention, I claim:

1. In apparatus of the character described, a cylinder member and a piston member movable relatively, said piston having a constricted passage therethrough for interconnecting the chambers in the cylinder on opposite sides of the piston, means for introducing liquid under pressure into one of said chambers, means responsive to the pressure of the liquid being introduced for blocking said passage, an anchor element connected with one of said members and a relatively movable steering element connected with the other of said members.

2. In apparatus of the character described, a cylinder member and a piston member movable relatively, said piston having a passage therethrough for interconnecting the chambers in the cylinder on opposite sides of the piston, removable and replaceable means for restricting said passage, means for introducing liquid under pressure into one of said chambers, means responsive to the pressure of the liquid being introduced for blocking said passage, an anchor element connected with one of said members and a relatively movable steering element connected with the other of said members.

3. In steering mechanism for accomplishing relative movement between an anchor member and a movable steering member, a cylinder, a piston assembly comprising a piston slidable in said cylinder and a pair of tubular conductors attached to said piston and projecting through the ends of said cylinder, said piston having a constricted passage therethrough for interconnecting the chambers of the cylinder on opposite sides of the piston, said piston assembly having normally closed ports between each tubular conductor and the adjacent chamber, and valve means responsive to an increase of pressure in one of said tubular conductors for opening the corresponding port and blocking said passage.

4. In steering mechanism for accomplishing relative movement between an anchor member and a movable steering member, a cylinder, a piston assembly comprising a piston slidable in said cylinder and a pair of tubular conductors attached to said piston and projecting through the ends of said cylinder, said piston having a constricted passage therethrough for interconnecting the chambers of the cylinder on opposite sides of the piston, said piston assembly having normally closed ports between each tubular conductor and the adjacent chamber and having normally open ports at the ends of said constricted passage, and valve means at each end of the piston responsive to an increase of pressure in the tubular conductor at that end of the piston for opening the port from said conductor to the adjacent chamber and for closing the port from that chamber to the said passage.

5. In apparatus of the character described, a cylinder member and a piston member movable relatively, said piston having a constricted passage therethrough for interconnecting the chambers in the cylinder on opposite sides of the piston, means for introducing liquid under pressure into one of said chambers, means responsive to the pressure of the liquid being introduced for blocking said passage, an anchor element connected with one of said members and a relatively movable steering element connected with the other of said members, and spring means for biasing said piston toward central position in its cylinder.

6. In apparatus of the character described, a cylinder, a piston therein having cylindrical lands at its ends engaging the cylinder wall and having a surface therebetween sloping from each of said lands inwardly toward the middle of the piston, a pair of relatively movable operating elements connected to said cylinder and piston respectively and a plunger carried by said cylinder and spring-pressed inwardly to bear upon said sloping surface for biasing the piston toward an intermediate position in the cylinder.

7. In apparatus of the character described, first and second relatively rotatable concentric tubular members, a cylinder disposed with its axis perpendicular to the axis of said members mounted on said first member to swing about a pivot parallel to the members, a collar rotatable upon said first member, a piston in said cylinder, a connecting rod for the piston, said rod and said collar being connected by a pivot parallel to said first pivot, and means for communicating turning movement from said collar to said second member.

8. In apparatus of the character described, first and second relatively rotatable concentric tubular members, a cylinder disposed with its axis perpendicular to the axis of said members mounted on said first member to swing about a pivot parallel to the members, a collar rotatable upon said first member, a piston in said cylinder, a connecting rod for the piston, said rod and said collar being connected by a pivot parallel to said first pivot, and a pair of torque arms hinged together and to said collar and second member respectively for communicating turning movement from said collar to said second member.

RAYMOND E. GREENOUGH.

REFERENCES CITED

The following references are of record in the file of this patent:

UNITED STATES PATENTS

| Number | Name | Date |
|---|---|---|
| 2,108,498 | McLeod | Feb. 15, 1938 |
| 1,876,104 | Tucker | Sept. 6, 1932 |
| 2,275,372 | Magrum | Mar. 3, 1942 |
| 2,022,698 | Vickers | Dec. 3, 1935 |
| 2,199,681 | Timm | May 7, 1940 |
| 2,279,074 | Stearman | Apr. 7, 1942 |
| 2,329,168 | Wassall et al. | Sept. 7, 1943 |
| 867,282 | Macfarren | Oct. 1, 1907 |
| 2,240,039 | Hickman | Apr. 29, 1941 |

FOREIGN PATENTS

| Number | Country | Date |
|---|---|---|
| 505,109 | Great Britain | May 4, 1939 |
| 510,290 | Great Britain | July 31, 1939 |